(12) United States Patent
Brown et al.

(10) Patent No.: US 6,626,299 B1
(45) Date of Patent: *Sep. 30, 2003

(54) ENVIRONMENTALLY FRIENDLY FILTER CARTRIDGE

(75) Inventors: Gene W. Brown, Kearney, NE (US); Jeffrey E. D. Rogers, Kearney, NE (US)

(73) Assignee: Baldwin Filters, Inc., Kearney, NE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/910,885

(22) Filed: Aug. 13, 1997

Related U.S. Application Data

(63) Continuation-in-part of application No. 08/575,833, filed on Dec. 20, 1995, now Pat. No. 5,685,985.

(51) Int. Cl.[7] .............................................. B01D 27/06
(52) U.S. Cl. .................................... 210/450; 210/493.2
(58) Field of Search ............................ 210/450, 493.1, 210/493.2; 55/502; 277/918

(56) References Cited

U.S. PATENT DOCUMENTS

| | | | | |
|---|---|---|---|---|
| 2,460,168 A | * | 1/1949 | Caserta | 264/135 |
| 3,095,290 A | * | 6/1963 | Hockett | 210/493.1 |
| 4,318,809 A | | 3/1982 | Bethel | 210/117 |
| 4,954,252 A | | 9/1990 | Griffin et al. | 210/136 |
| 5,082,476 A | | 1/1992 | Kahlbaugh et al. | 55/498 |
| 5,250,179 A | | 10/1993 | Spearman | 210/493.2 |
| 5,342,511 A | | 8/1994 | Brown et al. | 210/137 |
| 5,389,260 A | | 2/1995 | Hemp et al. | 210/450 |
| 5,399,264 A | | 3/1995 | Pulek et al. | 210/493.2 |
| 5,484,466 A | | 1/1996 | Brown et al. | 55/498 |
| 5,556,542 A | | 9/1996 | Berman et al. | 210/493.2 |
| 5,587,066 A | * | 12/1996 | Covington | 210/450 |
| 5,685,985 A | * | 11/1997 | Brown et al. | 210/450 |
| 5,741,421 A | * | 4/1998 | Erdmannsdoerfer et al. | 210/450 |

FOREIGN PATENT DOCUMENTS

| | | | | |
|---|---|---|---|---|
| DE | 4309858 A | | 9/1994 | |
| EP | 0318079 | | 5/1989 | |
| GB | 2134811 | * | 8/1984 | 210/493.2 |

* cited by examiner

*Primary Examiner*—Matthew O. Savage
(74) *Attorney, Agent, or Firm*—Leydig, Voit & Mayer, Ltd.

(57) ABSTRACT

A filter cartridge for use in a filter system, in which the cartridge has no structural metal parts and is adapted for environmentally acceptable disposal. A pleated paper filter media is formed into a cylinder, and end caps at the axial ends of the cylinder hold the shape of the filter. Sealing gaskets are associated with the end caps. At least one side has a radial seal formed at the outer periphery of the filter cartridge to protect the associated end cap from higher a pressure region found at the outer periphery. The other axial end can have a similar radial filter in some applications, or in other applications, where flow at that end of the filter is not desired, can utilize an axial seal specially configured to protect the associated end cap from higher pressure at the outer periphery. Maintenance of lower pressure at the respective end caps places any axial loads on the filter in tension, and thereby prevents the application of axial crushing loads on the filter cartridge.

22 Claims, 11 Drawing Sheets

ENVIRONMENTALLY FRIENDLY FILTER CARTRIDGE

CROSS-REFERENCE TO A RELATED APPLICATION

This application is a continuation-in-part application of U.S. application Ser. No. 575,833, filed Dec. 20, 1995, entitled environmentally Friendly Filter Cartridge now U.S. Pat. No. 5,685,985.

FIELD OF THE INVENTION

This invention relates to filters, and more particularly to a disposable filter cartridge which is disposable in an environmentally acceptable manner.

BACKGROUND OF THE INVENTION

In our prior application, Ser. No. 08/575,833 (hereinafter our prior application), we disclosed and claimed a filter cartridge which proved to be a highly effective advance in the art. This application is intended to describe and claim certain improvements therein, particularly in the area of the end caps.

A very common use for such filters is in the lubrication system of the standard internal combustion engine, e.g., automotive engines, truck or heavy equipment engines, and stationary power sources. The invention, however, has broader applicability, and can also be used in hydraulic, fuel and air filter applications.

In all of these applications, the filter must be changed periodically. Taking the lubrication system example, man automotive application, the oil filter is typically changed every several thousand miles. There are a limited number of reusable oil filter types available or in use, but in most high quality lubrication systems, disposable spin-on oil filters are used, and these can create a disposal problem.

In the early days of filters, it had been common to utilize cartridge type oil filters which fit into a removable housing. The housing was removed from the oil filter mount on the engine, the cartridge removed from the housing, the housing cleaned, a new cartridge installed, and the housing with new cartridge then replaced on the engine. Cartridges for filters of that type usually included a cellulosic filtering medium and a supporting center tube, typically of metal mesh or expanded metal. Oftentimes, such cartridges also included an exterior metal support. The metal supports, and particularly the center tube (or outerwrap), were needed to prevent the filter from being crushed by the pressure generated in the lubricant being filtered.

Differential oil pressures in an automotive hydraulic system can rise substantially at engine start-up, and particularly during malfunctions such as a plugged filter malfunction (due, for example, to water or excess engine wear metals in the oil), and can reach 200 psi or more.

In summary, conventional practice in the past required the use of a support tube in combination with cellulosic filters. The cellulosic filter provided good filtering capability, and the metallic supporting structure,provided the necessary rigidity and differential pressure withstanding capability. Disposal of the cartridge was, complicated by the metal supporting structure which made crushing impractical and complete incineration impossible.

More modern automobiles have migrated to the spin-on filter. While the spin-on filter is typically more expensive, and creates a greater disposal problem, the simplicity of removing an old filter, then spinning a new one on in its place has driven the industry in that direction. The spin-on filter not only has the typical cellulosic filter elements, but also has an external shell of sheet metal, a center supporting tube, a threaded base plate and all the necessary structure to old the filter in place and keep it from being crushed. After it is used, the entire spin-on filter, metal shell and all, must be discarded.

Environmental regulations, the limited availability of landfills, and the greater awareness on the part of the public with respect to landfill pollution have created the need for an oil filter of the type which can be safely disposed of in an environmentally acceptable way. Certainly the canister type spin-on filters have their difficulty on this issue, because they have a substantial metal content, along with the paper content, gasket content, and residual oil. Even the older variety of cartridge type filters have disposal problems, because they contain both metallic parts (for support) as well as the cellulosic parts (for filtering).

Attempts have been made to produce an environmentally disposably acceptable filter (i.e., an environmentaly friendly filter), but they have also suffered their drawbacks. For example, it has been, proposed to utilize a filter cartridge with no metallic center support tube, and build the support tube into the filter housing. However, these approaches have been less than satisfactory for a number of reasons.

One of the problems is encountered when using a radial seal of the main seal between the inside of the filter and the atmosphere. The problem is the difficulty of disassembling the filter housing in order to change the cartridge. The sealing arrangements have been such that an unusual amount of torque is needed to detach the cover from the housing. Even more significantly, while the center support tubes have provided protection from crushing the filter paper elements in the radial direction, there are significant pressure drops experienced along the axis of the filter. Those pressure drops can be large enough to either unseat the filter and cause leakage around the gasket at one or the other end cap, or to begin to compress or crush the filter along its axis. Thus, in these attempts, while they apparently have provided a filter cartridge with no metallic parts, the filters themselves have been less desirable than standard types because of these difficulties.

It is possible, by making certain compromises, to compensate for the lack of strength of an unsupported filter cartridge by using bypass valves either in the filter or in the engine. The function of a bypass valve is to respond to a pressure differential buildup caused, for example, by a plugged filter, and bypass oil around the filter. In effect, the bypass valve limits pressures in the system, but at the cost of passing unfiltered oil to the equipment. That might be acceptable in an automotive application, but in other applications it is completely undesirable. For example, a pressure relief valve is undesirable in those cases where passing unfiltered fluid might do permanent damage to the machinery being protected. Typical examples are a diesel fuel system or a hydraulic system. In those, it is considered preferable to allow the filter to plug to protect the equipment from a catastrophic and costly failure. To withstand the pressures as the filter plugs in such systems, the filter cartridge must have adequate structural support, which eliminates the possibility of using the unsupported filter cartridges which have been available in the past.

SUMMARY OF THE INVENTION

In view of the foregoing, it is a general aim of the present invention to provide a filter cartridge which is crushable or burnable for disposal purposes, but which has operating characteristics capable of reliably meeting the stringent requirements normally associated with metal housed spin-on filters. Further in that regard, an object is to provide such a filter cartridge which does not require the use of a relief valve to limit pressure in the system. The invention can be used in relief valve systems, but the relief valve is not necessary to protect the filter.

It is an object of the present invention to provide a high performance filter cartridge having no metallic supporting elements, and adapted to cooperate with a filter housing such that the compressive forces on the filter element are limited and are tolerable.

It is a further object to control pressures applied to the filter cartridge in such a way that any axial forces on the filter media primarily place the media in tension (where the filter media has significant strength) rather than in compression (where it has much less strength).

A resulting object is to impose loads on the filter cartridge which it is capable of withstanding, such as compressive loads radially where the filter element is supported, and axial tension loads which the filter is more capable of supporting than axial compressive loads.

It is a detailed object of the invention to provide such a filter cartridge in both single flow and dual flow types.

A further detailed object is to provide such a filter assembly which is not only environmentally acceptable, but which is user friendly. In that respect, it is an object to provide a filter cartridge which can be installed in only one way, and in a way which assures that the filter assembly will be properly gasketed when assembled. In other words, an object is to make changing of the filter substantially foolproof, so that untrained individuals can reliably perform a filter change.

Other objects and advantages will become apparent with reference to the following detailed description when taken in conjunction with the drawings in which:

Figure 1:
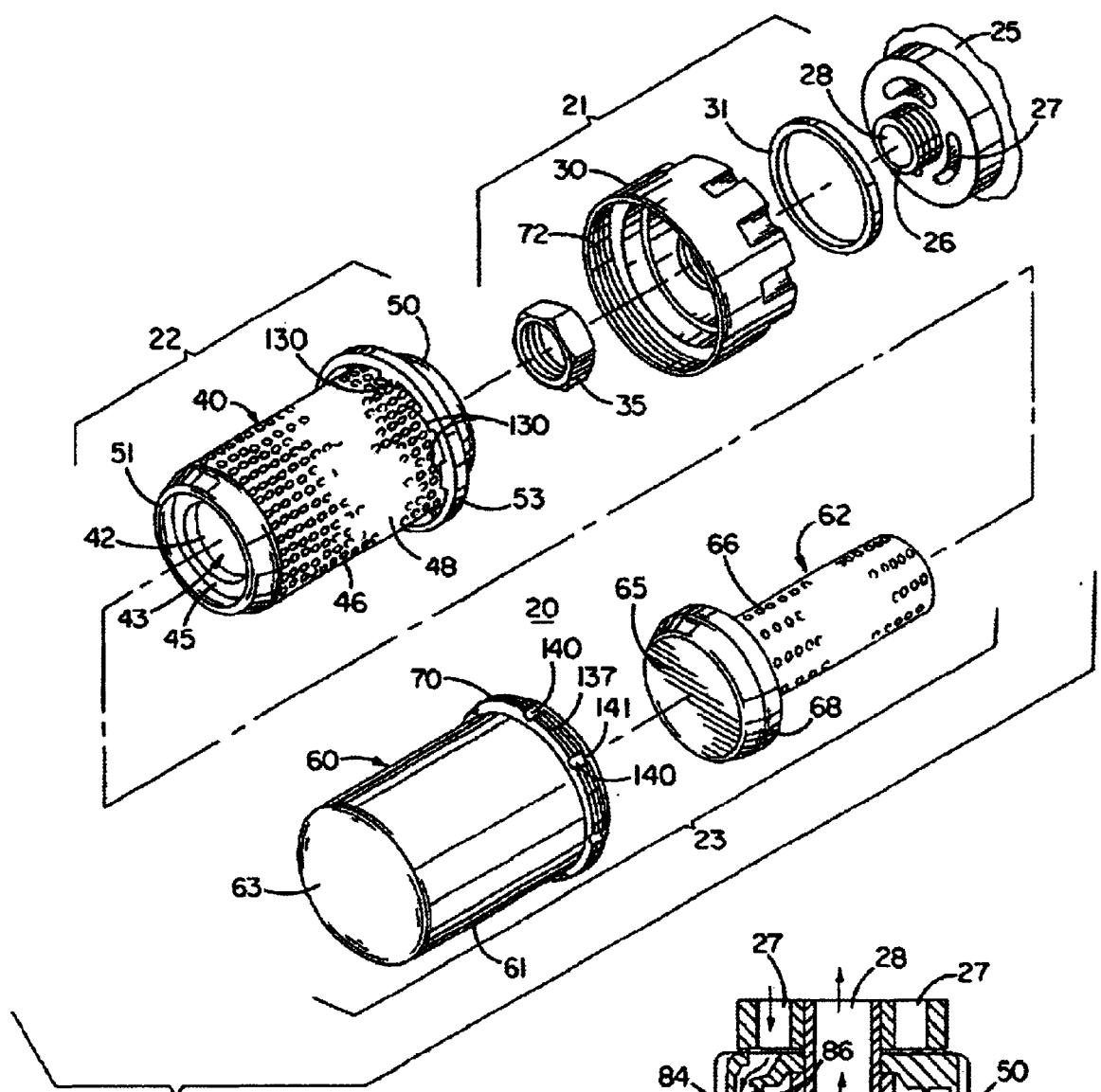
FIG. 1 is an exploded perspective view showing a filter system using a disposable filter cartridge constructed in accordance with the present invention and particularly suited for retrofit to existing equipment.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

As shown in the drawings for purposes of illustration, the invention is embodied in a filtration system 20. The filtration system 20 of the preferred embodiments is a lubricant filter system, such as an oil filter system for an internal combustion engine. As noted above, the invention is fully applicable to other filtering applications, such as fuel filters, hydraulic filters, and air filters. The description of the preferred embodiment in connection with an oil filter system will, however, be an adequate description of the invention for application of the principles of the invention to these other filtering applications.

Figure 2:
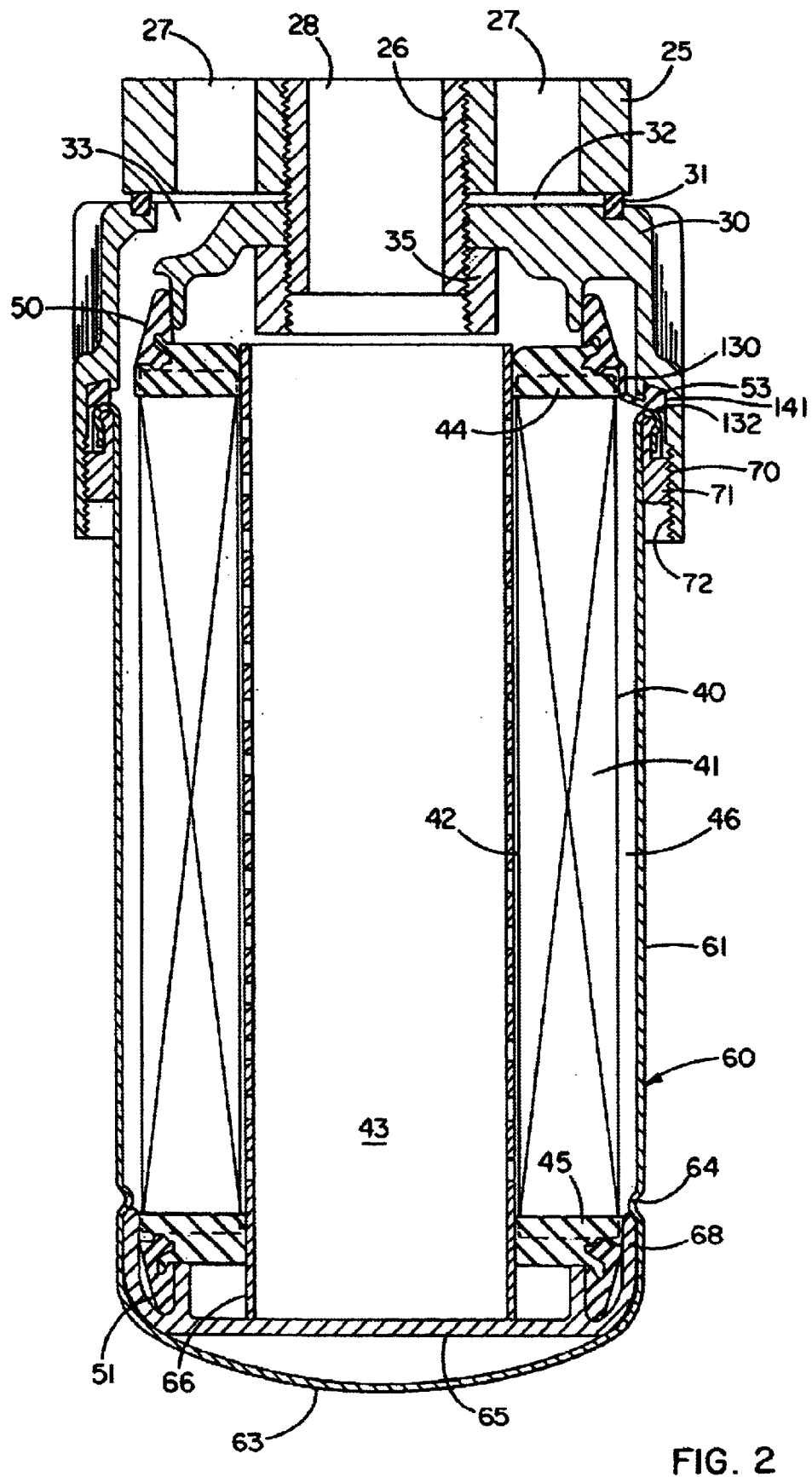
FIG. 2 is a cross-sectional view in elevation through the center of the filter of FIG. 1.

Turning then to the drawings, FIG. 1 shows the filter system 20 in exploded perspective view, as including three main groupings, a set of engine mounted components 21, a replaceable filter cartridge 22 exemplifying the present invention, and a removable housing 23. An internal combustion engine is schematically illustrated at 25 having a spud 26 for normal attachment of a spin-on filter. Arcuate oil inlet ports 27 provide a supply of oil into the filter, and an internal passage 28 in the spud 26 provide a port for oil flow back to the engine. Mounted to the engine is a filter base plate 30 associated with gasket 31. The assembled relationship of those elements is best illustrated in FIG. 2 which shows the gasket 31 sealing an internal chamber 32 which provides a path for oil flow from the inlet ports 27 to a filter inlet 33. The base plate 30 is permanently secured to the engine by internal threads, and a lock nut 35 prevents the inadvertent loosening of the base plate.

The filter cartridge 22 is shown in perspective in FIG. 1 and in sectioned elevation in FIG. 2. It will be seen that the cartridge includes a cylindrical filter 40 comprising filter media 41 arranged in a cylinder and defining an inner cylindrical wall 42 forming an internal chamber 43 and an outer periphery 46, also cylindrical. It will be appreciated from an inspection of FIGS. 1 and 2 that the filter cartridge contains no supporting center tube. The filter media is preferably cellulosic, in the form of treated paper of relatively conventional pleated construction. After the paper is pleated, it is formed into a cylinder, with a cylinder of inside pleats forming the internal periphery 42 and a concentric cylinder of outside pleats forming the outer periphery 46. A paper overwrap 48 (FIG. 1) can provide some measure of protection, it can also enhance the appearance and provide a place for product identification. Other forms of filter media are also usable, although the pleated paper filter is currently preferred.

The absence of a center tube in the filter cartridge is significant in that it eliminates the need for a metallic filter support. The center tube-free cartridge construction, along with the gasket and end cap construction (to be described below) which are of environmentally acceptably disposable materials, provide for a filter cartridge which, after use, can be readily discarded. As one alternative, for example, the filter cartridge can be incinerated, since it contains no toxic materials and no non-incineratable metal. As a further alternative, the filter can be crushed, which not only removes oil residue, but also substantially reduces the volume. The crushable filter cartridge, after being crushed to remove oil and reduce its volume, can be incinerated or deposited in a landfill. The center tube-free construction is of significance in both of the disposal alternatives.

For the purpose of maintaining the cylindrical shape of the filter cartridge and for securing and sealing the ends thereof, end caps 44, 45 are located on the axial ends of the filter media. Adjacent the end caps 44, 45 are radial seal gaskets 50, 51 whose structure and functionality will be described in greater detail below. The overall appearance of the filter cartridge is illustrated in FIG. 1, which shows the filter 40, radial seal gaskets 50, 51, and unsupported cylindrical wall 42 forming an unsupported inner chamber 43. The filter media 41 is also cylindrical, and as illustrated in FIGS. 1 and 2 is best covered by a paper overwrap 48. As will be described in greater detail below, the filter assembly 22 also carries an integrally attached housing gasket 53 which is positioned at one end of the filter to make the filter insertable into the canister in one direction only, and which provides an automatically positioned gasket for sealing the filter housing.

Figure 14:
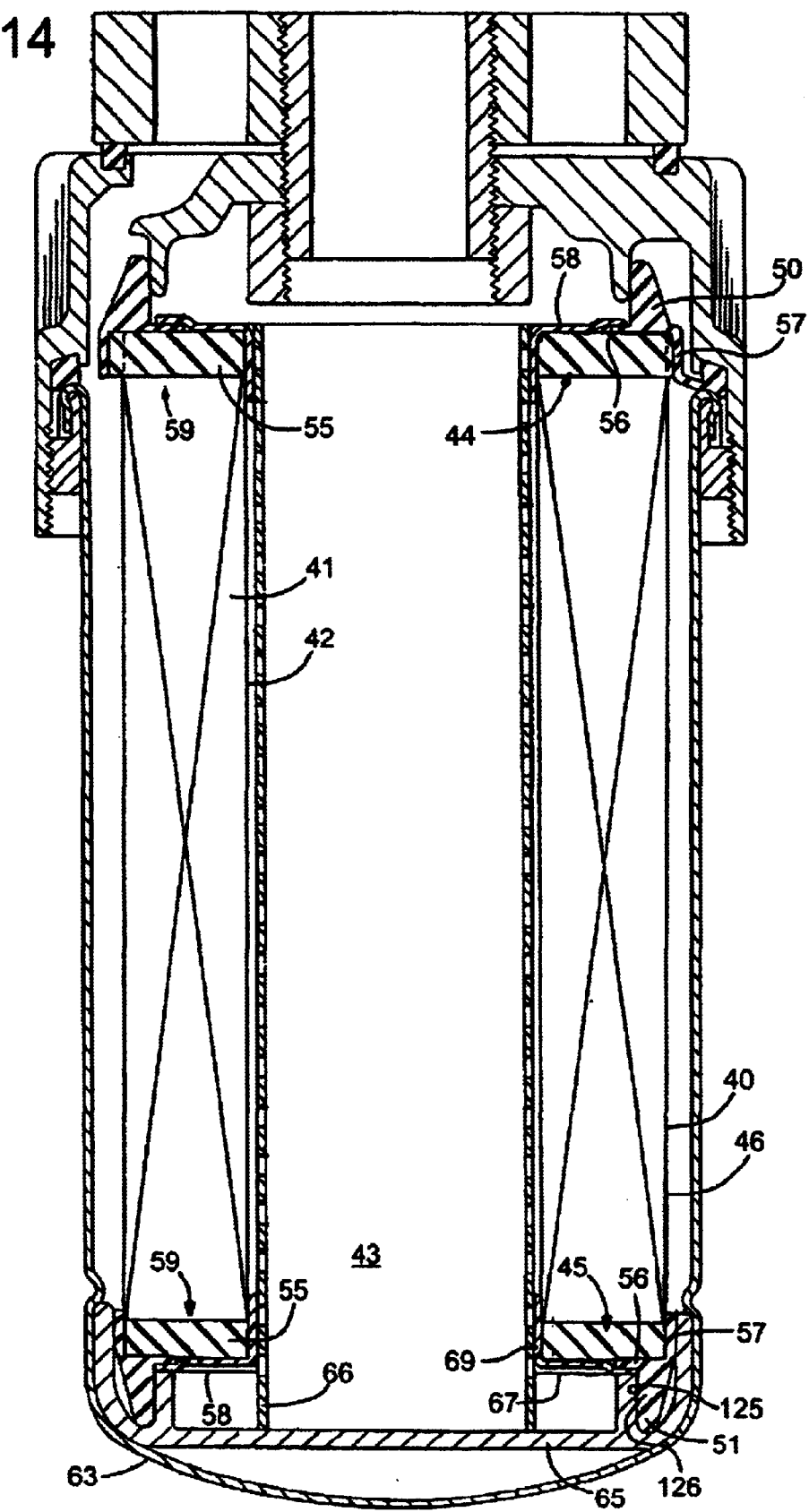
FIG. 14 is a sectional view of another embodiment of a filter system employing a filter cartridge and having end caps comprising thermoplastic contact members, the filter cartridge adapted for retrofit installations.

In the currently preferred embodiment of the invention, the end caps comprise thermoplastic contact members 58 (see FIG. 14) bonded to the ends of the filter media with potting material. Radial seal gaskets made of a preformed elastomeric material are secured in the end caps. As used herein, elastomeric material includes thermoset elastomers such as nitrile and rubber, and thermoplastic elastomers (TPEs). As best illustrated in FIG. 14, the end caps 44, 45 are located at opposite ends of the filter element. In the preferred embodiment, the contact members 58 of the end caps have a radially extending face 67 covering at least part of the end of the filter media 41 and a cylindrical wall 69 extending axially along the inner cylindrical wall 42. The contact members 58 are formed to accept a portion of the associated radial seal gasket 50, 51. When positioned as illustrated, the contact members 58 and radial seal gaskets 50, 51 form troughs 59 around the ends of the filter media, thereby allowing potting material 55 to be deposited in the troughs. The potting material seals the end of the filter media and secures the contact members 58 and radial seal gaskets 50, 51 in place In this embodiment, the contact members are preferably formed of thermoplastic material, such as nylon.

Figure 16:
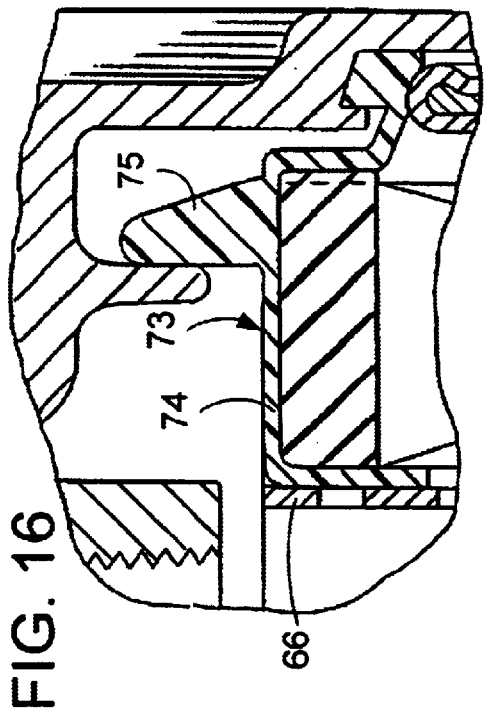
FIG. 16 is an enlarged sectional view of the filter cartridge of yet another embodiment of a filter system employing a filter cartridge and having a contact member formed integrally with a radial seal gasket to form a composite member.

In an alternative embodiment, the contact members 58 and radial seal gaskets 50, 51 may be integrally formed of the same material to obtain composite members 73. As illustrated in FIG. 16, each composite member 73 has a contact portion 74 which extends across the end of the filter and a gasket portion 75 which projects axially from the contact portion to provide a radial seal gasket. The contact and gasket portions 74, 75 are shaped similar to the contact member 58 and radial seal gasket 50, respectively, as described above. Thermoset elastomers, such as nitrile or rubber, and thermoplastic elastomers, including the materials sold under the trademarks GEOLAST and SANTOPRENE, are preferred for forming the composite members. It is, however, recognized that the end caps and radial seal gaskets can be formed of other moldable material, such as epoxy, as illustrated in FIGS. 1–5.

Further details of the filter cartridge will be emphasized below. For the moment, attention will be directed to the housing into which the filter is inserted and by which the filter is associated with the base plate. It will be seen in FIGS. 1 and 2 that a metallic housing 60 comprises a formed sheet metal shell 61 and contains an inner support tube assembly 62 positioned in the closed end 63 of the shell 61 and held in place by a continuous bead 64 formed around the periphery of the shell 61. The shell 61 is preferably a drawn metal canister; it is currently preferred to draw the shell of steel approximately 0.055" in thickness. Aluminum would also be useful, but since the shell is a removable and reusable part, it is preferred to use steel. The support tube assembly 62 includes a base plate 65 having a perforated tube 66, preferably of metal, but also possibly of plastic, attached securely to the base plate 65. The attachment can be by press fitting, welding, gluing or the like. The currently preferred tube is of perforated aluminum and is glued to the base plate. The base plate has a formed edge at the periphery thereof which presents a cylindrical flange 68 of a diameter which fits snugly into the cylindrical shell 62. A bead 64 is formed to secure the base plate 65 firmly in the base 63 of the shell 61. The permanent center tube 66 is thereby rendered integral with the canister 60.

Thus, in normal operation, and assuming the filter is disassembled, in order to install a clean filter on the engine, one first takes the canister 60 with internal integrally fixed center tube 66, and inserts a filter cartridge 40 over the center tube and into the canister. The partly assembly unit is then brought into position opposite the base plate 30, such that a ring 71 having external threads 70 and secured to the canister 60 near the open end thereof engages complementary threads 72 in the base member. The filter canister is then rotated to cause the threads 70, 72 to engage, ultimately compressing the gasket 53. With the gasket so compressed, the filter is secured in place, and the unit can be operated.

Figure 3:
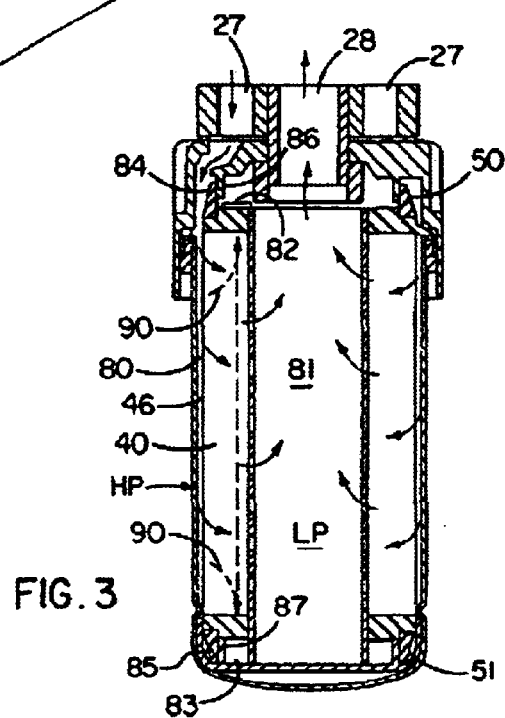
FIG. 3 is a diagram illustrating flows and pressures within the filter of FIG. 1.

Turning to FIG. 3, certain significant aspects of the interrelationship between the filter cartridge 40 and the filter assembly 20, will now be described. Radial seals 50, 51 were briefly referred to above. As will now be explained, those seals are important in imposing loads on the filter cartridge 40 in directions which the filter media 41 is likely to withstand, and by preventing the application of forces which are likely to destroy or deform the filter media. It will be seen in FIG. 3 that the filter cartridge 40 separates an outer upstream high pressure chamber 80 in the canister (designated HP) from a lower downstream pressure section 81 (designated LP) located in the bore of the filter cartridge. The solid line arrows show oil entering the filter through the inlet 27 for flow into the chamber 80, defined between the wall of the canister 61 and the outer periphery 46 of the filter cartridge. It will be apparent to those skilled in this art that the chamber 80 thus contains the highest pressure (the upstream pressure) in the system. Lubricant flows through the filter as indicated by the arrows and through perforations in the supporting center tube to enter the internal downstream chamber 81 where it flows through the port 28 back to the engine, as indicated by the solid arrows. Because the flow direction is from outside to inside, the pressure within the chamber 81 is at a lower pressure than that in chamber 80. It will also be appreciated that the lower pressure is present at he portion of the end cap bracket at 82 (see FIG. 3 and in the small chamber 83 adjacent the end cap 45. By placement of the radial seals at or very near the outer periphery of the filter element, the high pressure zone is restricted to the outer periphery 46, and all other portions of the filter, importantly including the end caps, are at a lower pressure. Thus, the lips 84, 85 of the radial seals are pressed firmly against mating flanges 86, 87 of the housing, enhancing the seal in that area.

Even more significantly, however, the fact that the end caps in areas 82, 83 are at a lower pressure, imposes a tensile force indicated by the dotted line arrows 90 on the filter media. The high pressure is applied at the outer periphery, and a lower pressure is applied at the end caps, which in effect, puts the filter media in tension as indicated by the arrows 90. Since the filter media is quite capable of resisting reasonably substantial tensile forces, and since the filter is restrained from significant axial expansion, due to positioning of the end caps against or near elements of the housing, the filter media will withstand these tensile forces.

This capability is significant when compared to certain prior designs which allow the high pressure to be applied to at least a portion of the end cap. The high pressure imposed at a portion of the end cap usually finds an opposing lower pressure at a different portion of an opposite end cap, resulting in a compressive force on the filter media. That force, which represents a crushing force on the axially unsupported filter media, can in many cases unseat the filter or indeed deform or begin to crush the filter, rendering the filtering system inoperative as a filter.

By virtue of deploying radial seals at the outer periphery in accordance with the present invention, the pressure differential from the outer periphery to the end caps is always controlled to place the filter media in tension, and a far superior and more reliable filter results.

With that understanding of the functionality, the structure of the filter cartridge and its relationship to the filter housing, which achieves that functionality will now be more fully described. The radial seal gaskets 50, 51 comprise an axially extending flexible flange 100 (FIG. 24), of a suitable elastomeric material. The material is preferably incineratable without creating toxic substances, and also suitable for landfill disposal. Nitrile rubber is currently the preferred material. In the currently preferred embodiment illustrated in FIG. 14, each radial seal gasket is configured as a preformed elastomeric ring with an attachment arm 56 fitting into an associated contact member 58 and a retention wall 57 extending axially along the outer periphery 46 of the filter element. Accordingly, the contact members 58 and radial seal gaskets 50, 51 form the troughs 59 about the ends of the filter media into which potting compound 55 may be deposited. The potting compound seals the ends of the filter element and secures the contact member and radial seal gasket in place.

It is also expected, however, to configure the gasket with flanges for potting into the end caps 44, 45, the end caps thereby joining the flexible gasket to the pleats of the paper filter, as illustrated in FIG. 2. The manner in which a potted end seal with integral gasket can be formed is described more fully in Brown et al. U.S. Pat. No. 5,484,466. The technique is altered in accordance with the present invention by eliminating the Plastisol potting compound which may produce undesirable combustion products, and using an environmentally acceptable potting compound in its place. For this alternative, we currently prefer the use of a two-part epoxy produced by Hardmann and identified by their references 20216A and 13403B. It is anticipated that the potting material can also be used to form the gasket itself, eliminating the need for the separate preformed elastomeric gasket 50.

Figure 4:
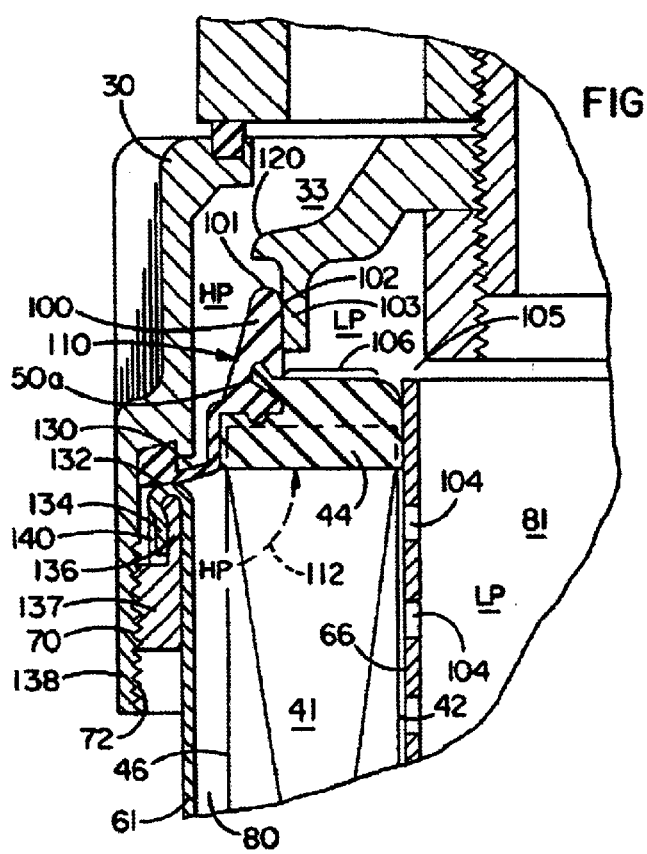
FIG. 4 is an enlarged cross-sectional view of the filter of FIG. 2 showing the oil inlet and filter cartridge radial seal at the inlet end.
Figure 5:
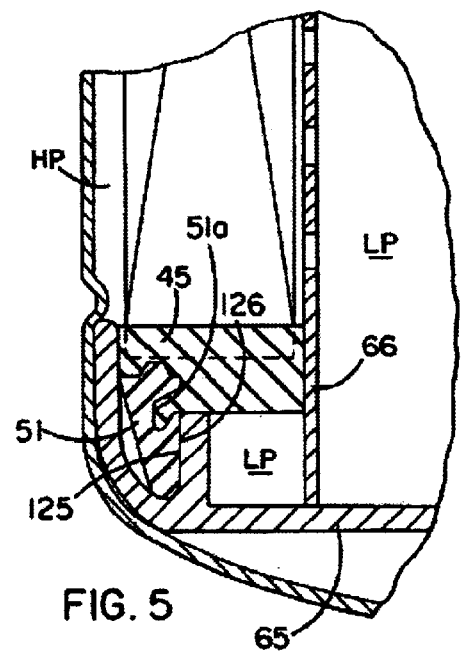
FIG. 5 is an enlarged view, similar to FIG. 4, but showing the radial seal at the opposite end of the filter cartridge.

According to the embodiment illustrated in FIGS. 4 and 5, the potting operation partly encapsulates the margins of the pleated paper, and partly surrounds and encapsulates an irregular surface 50a, 51a of the associated gasket. By virtue of the former connection, the end cap is securely fixed to the pleats, and holds the shape of the filter. By virtue of the second connection, the gasket is integrally connected to the end cap and thus to the pleated paper portion of the filter. The shape of the irregular potting compound connection to the gasket 50a and 51a provide a mechanical interlock of the gasket to the potting compound that holds them together in both a radial and an axial direction.

It will also be appreciated that the radial seal gaskets 50, 51 may be integrally formed with the contact members 58 to form composite members 73, as shown in FIG. 16 and described above.

The radial seal 50 preferably has a rounded or beveled nose 101 to facilitate insertion of the filter into the end cap, and a substantially flat sealing surface 102. The sealing surface 102 forms a continuous cylindrical surface sized and adapted to mate with the outside of a metal flange 103 which is formed as an element of the base plate 30. It will be recalled that the area between the cylindrical shell 61 and the outer periphery 46 of the filter cartridge is a high pressure zone, and in FIG. 4 that zone is designated as HP. It will also be recalled that the cylindrical cavity 81 within the filter cartridge 40 and to which oil flow communicates by way of ports 104 is at a lower downstream pressure, designated LP in FIG. 4. By virtue of the fluid passage generally designated 105, the low pressure LP is also seen at the exposed portions 106 of the upper end cap 44.

With that arrangement, the high pressure HP creates a force suggested by arrow 110 which presses the resilient flange 100 of the radial seal against the flange 103 in order to enhance sealing. In addition, the high pressure HP at the periphery 46 of the filter juxtaposed with the lower pressure LP at the portion,106 of the end cap creates a force signified by arrow 112 which places the filter media 41 in tension. The high pressure zone HP acting against the low pressure zone LP in the chamber 81 also creates a compressive force on the filter media 41. However, the inner periphery 42 of the filter element closely fits over the supporting permanent center tube 66 to support the filter media and thereby prevent crushing in the radial direction.

Attention will briefly be focused on the condition when the filter plugs. When the filter plugs, there is no flow or very low flow through the filter media 41, and the pressure LP in the chamber 81 drops to a very low level, whereas the pressure HP in the external chamber raises to the maximum which can be produced by the pump. The radial forces on the filter media 41 continue to be resisted by virtue of the support tube 66. The high pressure also serves to maintain the radial seal 100 in contact with the flange 103. If a portion of the end cap 44 were also exposed to high pressure, such as by positioning the sealant surface 102 further toward the inside of the filter, at a point intermediate its inner and outer peripheries as has been conventional, there would be high pressure at an external portion of the end cap and low pressure at an internal portion of the opposite end cap, creating an axial compressive force on the filter. That force might reach 200 psi in a plugged filter condition if no relief valve were present. In accordance with the invention, however, placing the radial seal 100 at the outer periphery and configuring the arrangement so that the entire exposed portion 106 of the end caps are maintained in a lower pressure environment, causes all of the forces across the paper media to be in tension, which can be relatively readily withstood by the filter media, thereby maintaining the integrity of the filter system.

As a subsidiary feature, the housing section 40 which supplies oil to the filter is provided with a flow diverter 120 (see FIG. 4) which diverts flow from the inlet port 33 into the external chamber 80 while preventing direct flow from impinging on the lip 101 of the radial seal. Thus, without the flow diverter 120, oil rushing through the inlet port 33, for example on startup, would tend to impinge on the radial seal 100 at the junction between the nose 101 and the point where it joins the flange 102, creating a force which would tend to lift the seal in high flow conditions. By positioning the flow diverter 120 to direct flow into the chamber but not directly on the interface between the radial seal and its mating flange, this potential source of filter leakage is avoided.

Turning to the other end of the filter cartridge, the opposite sealing arrangement will be briefly described. In the preferred embodiment, the lower end cap 45 has a contact member 58 of thermoplastic material and shaped as described in conjunction with the upper end cap 44, as shown in FIG. 14. Radial seal gasket 51 is likewise formed in a similar shape as radial gasket 50, to form a filter cartridge which has integral end caps and radial seals. The support plate 65, which supports the permanent center tube 66, also has a cylindrical flange 125 which mates an internal cylindrical surface 126 of the radial seal 51. The radial seal 51 is preferably formed identically to the radial seal 50, and will function as described in detail above. The low pressure LP and high pressure HP zones (with respect to the filter cartridge) are indicated by appropriate letters in FIG. 5.

A noteworthy feature of a filter system according to the present invention, in addition to the superior performance and characteristics described in detail above, is the simplicity of installation which results in foolproof installation without danger of an incorrect or faulty installation. More particularly, the filter cartridge is rendered unidirectional (with respect to the direction of insertion into the filter housing) by associating with the filter cartridge a housing gasket, and locating such gasket for ready and automatic installation between the mating elements of the housing when those elements are assembled. Thus, as will be seen in FIG. 1, a plurality of segmented flexible links or connectors 130, formed of the same material as the radial seal, such as nitrile rubber, are disposed around the periphery of the filter and join the radial seal portion 50 to a housing gasket 53. The links 130 support the gasket 53 displaced from the outer periphery of the filter cartridge. The diameter of the suspended gasket 53 is greater than the inner diameter of the shell 61, thus preventing the upper portion of the filter from being inserted into the housing 60. It will thus be apparent that the filter will be inserted into the housing in one direction only, with the end carrying the suspended gasket 53 the last to enter the housing.

Significantly, when the filter cartridge is inserted in that way, the gasket 53 overlies a shoulder 132 formed in the shell 61 (see FIG. 2). It will be seen in FIGS. 4 that the shell 61 has a reverse formed flange 134 at the upper end thereof, in gripping arrangement with a cylindrical tab 136 of threaded ring member 137. The ring member 137 is threaded at 70 (as noted above) to form threads which engage mating threads 72 formed in a lower portion 138 of the housing 30. A series of cutouts 140 formed in the threaded ring member 137 provide interfitting portions 141 (see FIG. 1) over which the lip of the housing is swaged to prevent the ring from rotating with respect to the housing. When the housing 60 with inserted filter cartridge is brought into position with respect to the fixed housing 30, the gasket 53 is in appropriate position, without the need for finger manipulation or the like, so that when the threads 70, 72 are engaged and tightened, the gasket 53 automatically seats to provide a seal between the shoulder 132 of the shell and an internal cylindrical sealing surface 141 of the housing 30.

In short, flexible links support a housing gasket in position with respect to the filter and provide two functions. First, they make it impossible to insert the filter into the housing in the wrong direction. Secondly, they hold the suspended gasket in appropriate position so that when the housing is brought into engagement with the base plate, the axial gasket is automatically placed in the correct position, without the need for finger manipulation. As a result, when the housing is rotated to engage the mating threads and tighten the filter assembly for use, the gasket is automatically seated.

The use of radial seals on a filter element for sealing the internal chambers facilitates the use of a simple axial seal as a housing seal. The use of an axial seal, instead of a radial seal, as a housing seal is also of significance. If a radial seal were used, as is done in some implementations, it is found that the torque needed to remove the housing from the base can be very great. However, in accordance with the present invention, the manner, in which the internal chambers are sealed allows the use of a simple axial seal for a housing gasket. As such, the gasket, which is self-aligning, is brought into compression only for the last fractional turn of the housing. The gasket is in compression only, and when it is desired to remove the housing to change the filter, only a reasonable amount of torque need be applied to the housing, and almost immediately upon turning, the gasket releases its holding power and allows the cover to be removed with relative ease.

Figure 6:
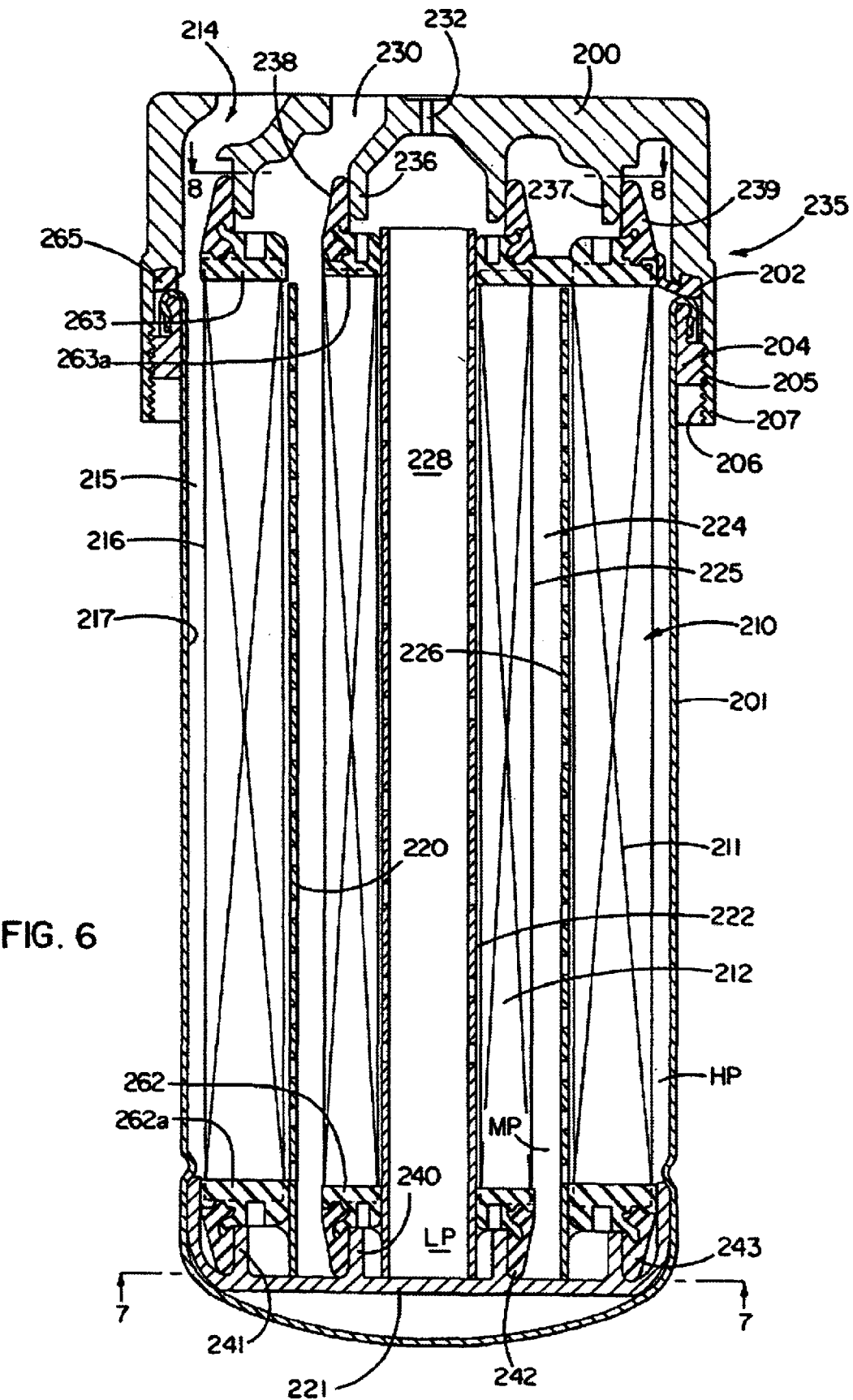
FIG. 6 is a sectional view of another embodiment of a filter system employing a filter cartridge embodying the present invention particularly suited to retrofit applications of the dual flow filter type.

Turning to FIG. 6, there is shown a further embodiment of the present invention. Like FIG. 1, the filter system of FIG. 6 is intended primarily as a retrofit. A mounting base 200 is provided for attachment to an engine, and a cylindrical canister 201 is provided for supporting a filter cartridge and for attachment to the base 200. The housing 201 is of sheet metal, like the FIG. 1 embodiment, and has a rolled flange 202 near the open end thereof, trapping a cylindrical threaded ring 204 carrying threads 205 which mate with threads 206 in the lower portion 207 of the base plate 200. A filter cartridge generally indicated at 210 is inserted within the housing, following which the housing 201 is secured to the base 200.

In contrast to the FIG. 1 embodiment, the FIG. 6 embodiment filter system is of the dual flow type as described in commonly owned Brown et al U.S. Pat. No. 5,342,511 and in Cudaback et al U.S. Pat. No. 5,078,877. Such filter includes two cylindrical coaxial filter elements, a first larger filter element 211 disposed in surrounding relationship to a second internal smaller diameter filter element 212. Primary flow to the filter is through an inlet port 214 to a cylindrical chamber 215 formed between the outer periphery 216 of filter element 211 and the inner wall 217 of the shell 201. A perforated center tube 220 carried by an end member 221 fits within the inner periphery of the filter element 211 for internal support. The internal filter element 212 is supported on a separate permanent center, tube 222 also carried by the end plate 221. A cylindrical chamber 224 formed between the outer periphery 225 of the smaller cartridge 212 and the inner periphery 226 of the center tube 220 provides a lower pressure chamber 224. In this case, the pressure is lower than the high pressure in the chamber 215, but higher than the pressure in an inner chamber 228 formed within the internal center tube 222. The various chambers are designated LP for low pressure, MP for medium pressure and HP for high pressure. It will be appreciated, however, that the medium pressure is generally a lower pressure chamber with respect to the high pressure chamber, and at the same time is a higher pressure chamber with respect to the low pressure chamber.

Flow through the filter is via inlet port, 214 through the outermost filter element 212 to the chamber 220. An outlet port 230 provides an outlet from the chamber 224, which is the main source of filtered oil for the engine. Further flow, however, is also through the inner filter element 212 to the inner chamber 228 and out a smaller restricted port 232 for return directly to the crankcase.

In practicing the invention, each of the filter elements 211, 212 is provided with a sealing arrangement adapted to maintain the higher pressure zone at the outer periphery of the filter element, and the lower pressure zone at the inner periphery as well as at the end caps thereof. Thus, and as described in connection with the previous embodiment, each of the individual filter elements has high pressure forces adapted for sealing the gasket arrangement, provides radial forces on the filter media which are supported by permanent center tubes, and in the axial direction, in which the filter cartridge has no direct support (by virtue of the slide-on fit over the permanent center tube), the forces imposed on the filter media are in tension.

Thus, referring to the interfitting relationship between the upper portion 235 of the filter cartridge and the base plate 200, it will be seen that the base plate 200 carries a pair of cylindrical flanges 236, 237. It will also be seen that the inner filter section 212 carries a radial seal 238 having a cylindrical inner periphery adapted to mate with the flange 236. Similarly, the outer filter element 211 carries a radial seal 239 having an inner periphery adapted to mate in sealing relationship with the flange 237.

Referring to the lower portion of the filter, the domed end of the can contains a support plate 240 which carries the pair of permanent center tubes 222, 226. In addition, the support plate is formed with a pair of sealing cylindrical flanges 240, 241. The flange 240 mates with radial gasket 242 and the flange 241 mates with radial gasket 243.

Also as described in connection with the previous embodiment, the gaskets 242, 243 forming the radial seals are attached to the ends of the filter by contact members of the end caps. Preferably, the contact members are of thermoplastic material and are shaped similar to the contact members 58 described in the previous embodiment and FIG. 14. Accordingly, the contact members of this embodiment are not described in detail and do not appear in FIG. 6. The dual filter embodiment, however, will require two sets of two contact members, one set for each filter element. The contact members are preferably attached to the ends of the filter element with potting material and secure the attachment arms of the associated gaskets 238, 239 to form sealing gaskets attached to the outer peripheries of the respective filter elements.

Figure 7:
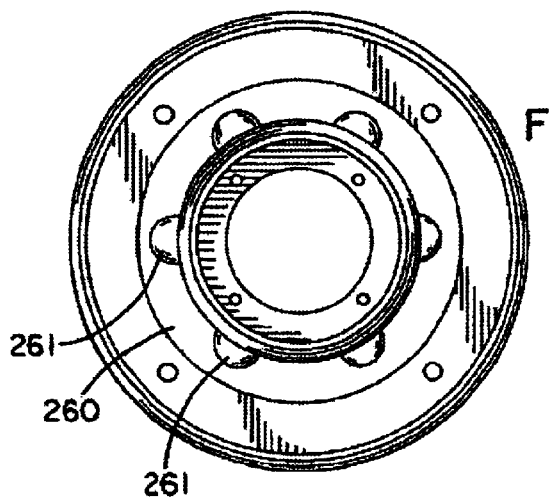
FIG. 7 is a bottom view of the filter cartridge (removed from its housing) taken generally along the line 7—7 of FIG. 6.
Figure 8:
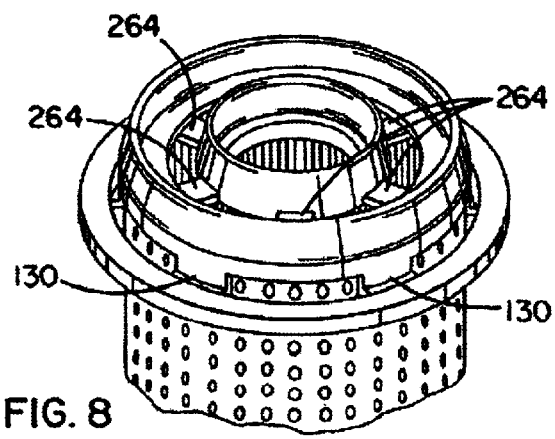
FIG. 8 is a perspective view taken generally along the line 8—8 of FIG. 6, and showing the integral suspended housing gasket assembly.

For purposes of providing a unitary filter cartridge having two filter elements, special gasketing and attachment techniques are utilized as illustrated more fully in FIGS. 7 and 8. FIG. 7 is a view of the filter cartridge removed from its housing, and taken generally along the line 7—7 of FIG. 6. It shows that the filter media has a zone 260 created between the inner periphery of the outer filter and the outer periphery of the inner filter. Angularly spaced lugs 261, formed of the same potting material which forms the end caps 262, 262a, are formed about the periphery of the inner filter element, and extend radially outwardly in order to maintain separation between the two filter elements in the zone 260. These lugs help to get the inner element lined up with the centertube in the case where the filter is mounted horizontally or somewhat off vertical. If these lugs were not present, the inner element might "sag" and bump against the end of the bypass centertube and prevent axial insertion of the cartridge.

FIGS. 6 and 8 shows the opposite end which has the end cap between the two filter elements formed with weblike connectors 264 which attach the end cap 263 of the outer filter element to the end cap 263a of the inner filter element. Thus, at the upper end of the filter, the two filter elements are attached together rather securely by means of the interattached links 264. Gaps between the links allow flow through the filter as is needed. It is worthy of note that the full flow centertube is made shorter than the bypass centertube in order to leave axial space for the connectors between the full flow and bypass filters, and to force the concentric elements to self align for easy insertion. At the opposite end of the filter, the links tend to have enough rigidity to support the inner filter element out of contact with the inner periphery of the outer filter element. However, the spaced lugs 261 serve further to maintain the spacing between those elements. The lugs are preferable tapered so that the inner filter element is centered as the filter is inserted over the pair of support tubes (see FIG. 7) as the two-element filter cartridge is inserted into the housing 201.

Like the filter cartridge of FIG. 2, the composite filter cartridge of the FIG. 6 embodiment also carries a cylindrically supported housing seal 265. The seal, as in the previous embodiment, makes the filter insertion unidirectional, and at the same time makes the positioning of the gasket 265 automatic, so that when the canister is brought to the housing and rotated, the filter system is secured in place with the gasket automatically positioned to provide the appropriate seal.

The filter system embodiments described thus far have been designated as retrofit filter assemblies, because they are readily adaptable to placement on existing engines in place of conventional filters. The full filter of FIG. 2 is readily positionable over a spud and A secured with a lock nut. The axial extent from the engine is limited, and the cartridge and center tube are all contained within a metallic housing which can be manually manipulated into position at the base plate from almost any angle. When in final position, the housing must, of course, be coaxial with the base plate, so that the threads can be engaged and the filter secured in place. However, until that point, the filter housing with inserted filter cartridge can be pivoted and manipulated around obstructing engine components in order to be brought into alignment. The dual flow filter of FIG. 6 uses a separate casting 200, which bolts to an engine in place of a conventional external thread casing normally used to mount a spin-on filter to the engine. The bolts attaching the casting 200 to the engine are not shown for the sake of simplicity. The separate casting concept is used in the dual flow filter because it is more practical and much simpler and results in a shorter overall filter length when compared to the external thread on the existing casting. Much of this is due to the more of complex flow geometry of the dual flow filter.

Advantages can be achieved in applications where the design and placement of the filter assembly will allow the filter cartridge to be inserted along an axial path directly into a filter housing permanently attached to the engine. In such applications, the permanent housing can be closed by a simple cover; the filter housing, permanent center tubes, and related structure can be permanently mounted on the engine. In that case, only a small and relatively lightweight portion of the filter housing need be removed, i.e., the cover, and the rest of the filter system remains a part of the engine. Such an arrangement is advantageous not only for ease of access and the simplicity of removal and reinstallation, but also because the portions which are removed from the engine are a relatively minor part of the overall assembly, requiring less cleanup work on the mechanic's part.

Figure 9:
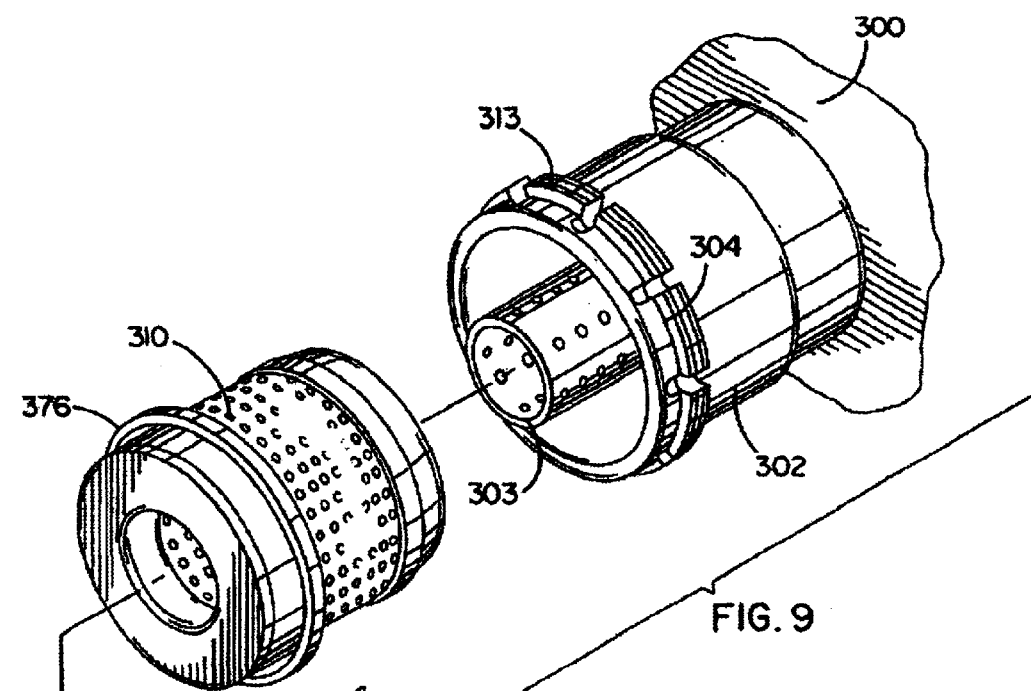
FIG. 9 is an exploded perspective view, similar to FIG. 1, of yet another embodiment of the present invention intended primarily for first-fit or OEM applications.

An example of such an arrangement for a full flow filter is illustrated in exploded perspective in FIG. 9. There is shown in schematic form an engine block 300 carrying a filter housing 302, preferably of sheet metal. A permanent center tube 303 is mounted within the housing to a base plate 301 (FIG. 10), and forms a permanent part of the housing. The housing itself carries a threaded flange 304 for attachment to complementary threads on a cover.

A filter cartridge 310 is provided, and is constructed in accordance with the present invention. The cartridge 310 has a sealing arrangement including at least one radial seal which isolates the end caps and inner periphery from high pressure at the outer periphery. The cartridge fits into the housing 302 and over the permanent center tube 303. Finally, a metal cover 311, preferably of cast metal, such as cast aluminum, is provided, having an internal threaded section 312 adapted to mate the threads 313 in the cylindrical flange 304. The filter cartridge 310 carries a suspended axial gasket 376, for automatically sealing the housing when the cover is tightened. The filter assembly 310, as in the other embodiments, has no supporting center tube, and relies for radial support on the center tube 303 of the housing. The lack of axial support is compensated by loading of the filter element in tension rather than in compression, as in the previous embodiments. As a final feature, the cover 311 may be provided with a drain plug 318 to allow the oil within the filter cartridge to be drained before the cover 312 is removed.

Figure 10:
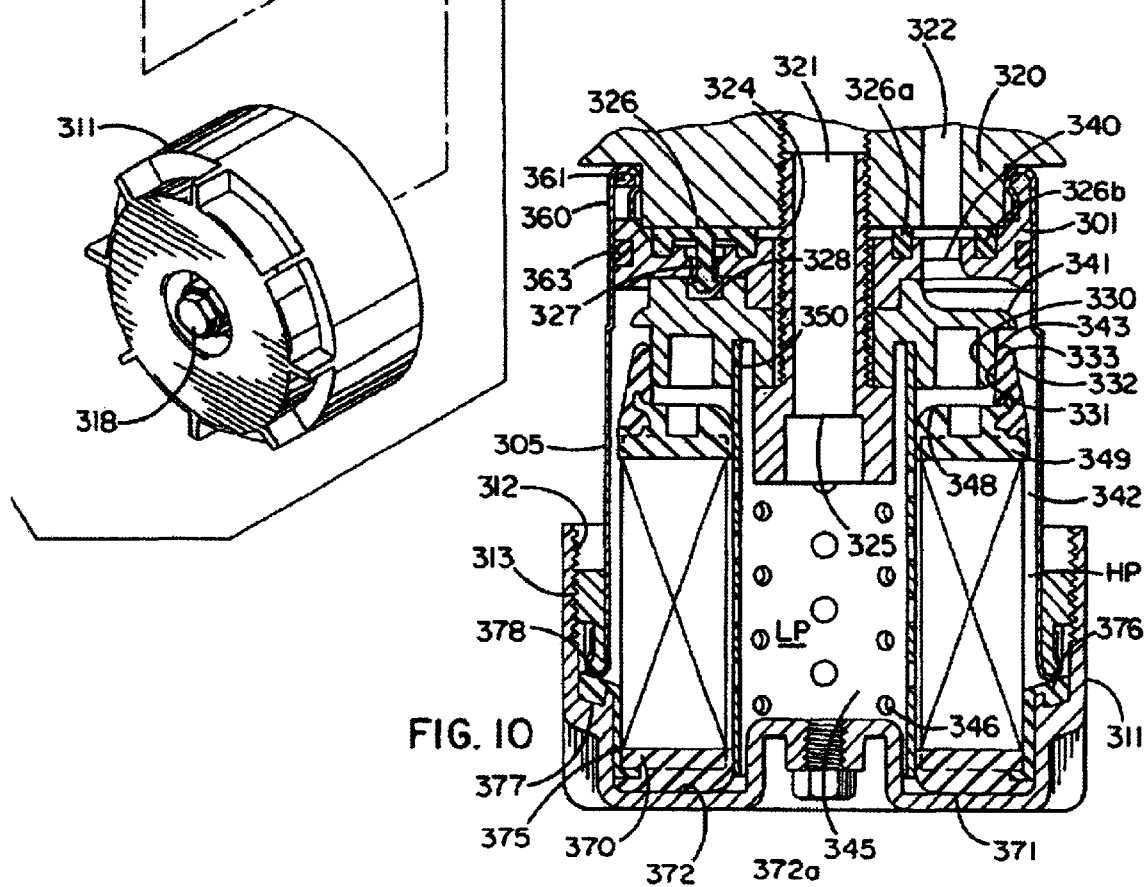
FIG. 10 is a sectional view in elevation through the center of the filter system of FIG. 9.
Figure 12:
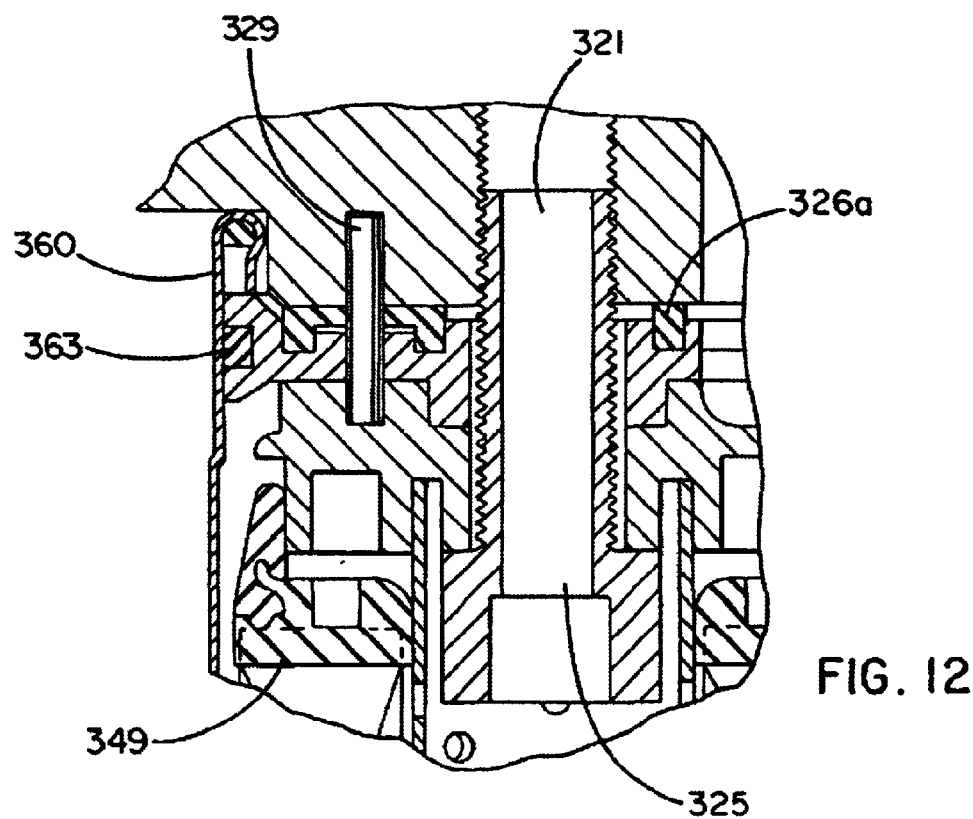
FIG. 12 is an enlarged sectional view showing the anti-rotation pin of the filter system of FIG. 10.

Referring in greater detail to FIG. 10, there is shown in partly schematic form the primary elements of an engine mounting area which can include a raised cylindrical section 320 which can be very simply machined to include one or more cored openings 322 for inlet oil flow to the filter, a central opening 321 for outlet oil flow to the engine, and a tapped hole in the opening 321 for securing the filter assembly thereto. A specially configured internal socket head bolt 324 is provided having a central opening 325 therein to allow passage of oil through the bolt while the bolt secures the housing to the engine block. A gasket 326 with barbed posts 327 fitting within apertures 328 in the base plate 301 provides appropriate sealing of the filter housing to the engine block. The engine to housing gasket 326 provides a pair of sealing rings. 326a, 326b which fluidically connect the aperture 322 in the engine block to an inlet port 340 in the base plate 301. An anti-rotation pin 329 (FIG. 12) secured to the base plate 301 and fitting within a cored aperture in the engine housing, is provided for preventing rotation of the filter housing when once properly installed on the engine.

Not unlike the base plate of the prior embodiments, the base plate 301 includes a cylindrical flange 330 sized to mate with a flattened surface 331 of a radial seal 332. The radial seal has a rounded nose 333 for facilitating insertion of the filter element into the housing. A flow diverter 341 in the inlet port diverts the flow into an outer cylindrical chamber 342 while avoiding direct impingement onto the interface 343 between the nose 333 of the radial seal and the flange 332 of the housing. As in the prior embodiment, a high pressure zone in the outer cylindrical chamber 342 forces flow to a lower pressure zone LP in the central cylindrical chamber 345 within the permanent center tube 346. It will also be seen that the low pressure zone LP appears at the upper surface 348 of the end cap 349 formed in the filter element 310.

As will be best appreciated from FIG. 10, the permanent center tube 303 is fixed within an aperture 350 of the base plate 301. Similarly, the cylindrical shell 305 has a rolled flange 360 at the base thereof to capture an internal flange 361 formed in the end plate. Thus, the cylindrical shell is securely affixed to the end plate. An O-ring gasket or square cross section round 363 prevents leakage between the high pressure zone 342 into the lower portion of the housing.

Figure 15:
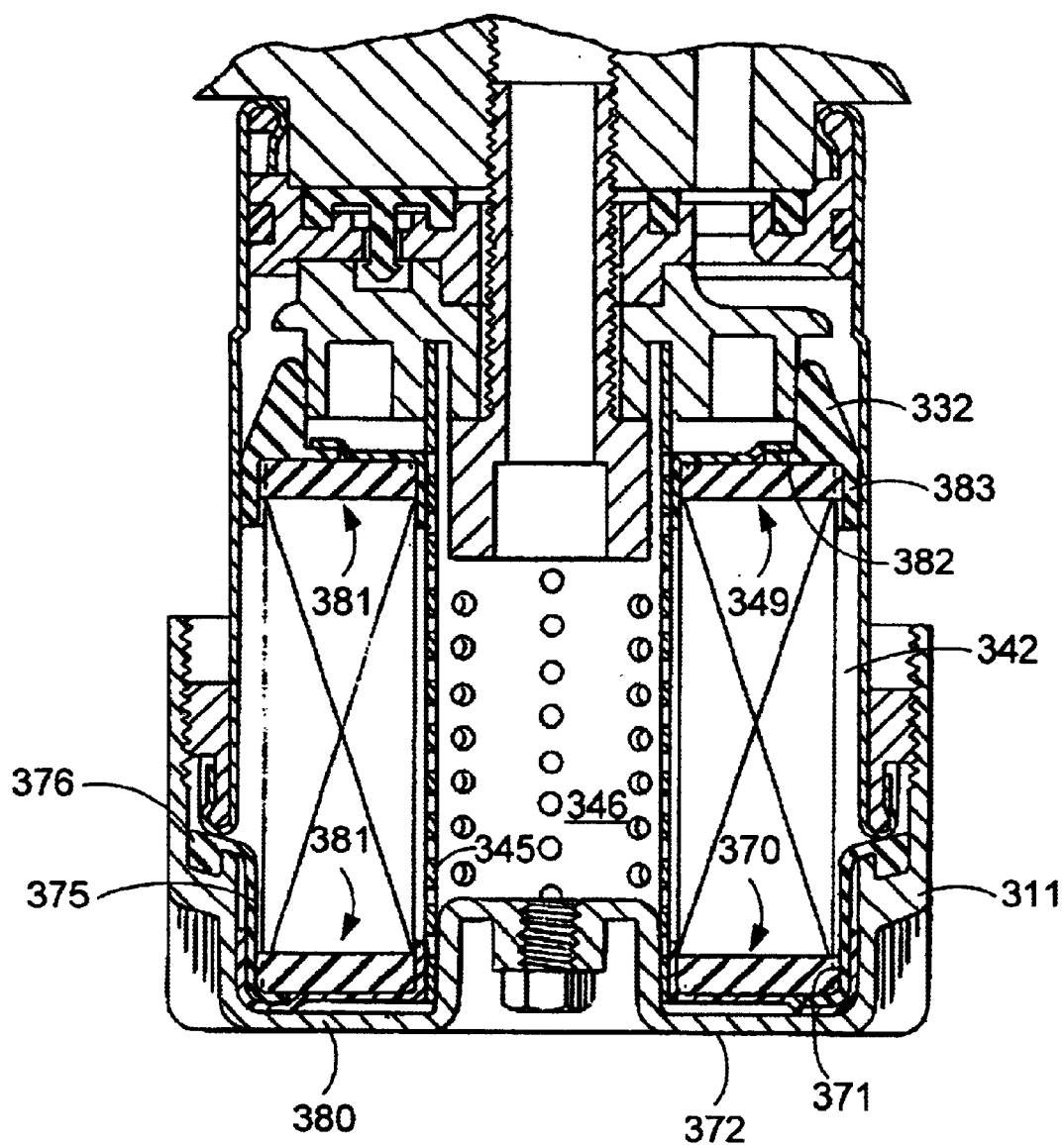
FIG. 15 is a sectional view of another embodiment of a filter system employing a filter cartridge and having end caps comprising thermoplastic contact members, the filter cartridge adapted for OEM installations.

It is a significant feature, as shown in FIGS. 10 and 15, that one of the seals associated with the filter cartridge 310 is an axial seal, and is configured to also isolate the high pressure zone at the periphery of the filter from the lower pressure zones at the end caps and within the filter. In the configuration illustrated in FIGS. 15, it will be seen that the lower end cap 370 of the filter cartridge 310 carries a contact member 380 having a flat surface 371 formed in a planar surface thereof and adapted to mate with a planar surface 372 of the cover assembly 311. A continuous flexible ring 375 having one end secured by the end cap 370 carries a suspended gasket 376.

In the preferred embodiment, the lower end of the filter cartridge is constructed as shown in FIG. 15, wherein the contact member 380 of end cap 370 is formed of plastic and defines an annular channel 381 sized to encompass an entire end of the filter element. The contact member 380 is adapted to accommodate and secure the suspension gasket 375. Potting material is deposited into the channel to seal the end of the filter element and to secure the contact member 380 and suspension gasket 375 in place. As described in the first embodiment noted above, the contact member 380 is preferably of thermoplastic material such as nylon. Furthermore, the suspension gasket 375 and contact member 380 may be integrally formed of thermoset elastomer material (such as nitrile and rubber) or thermoplastic elastomer material (TPE).

In the present embodiment, the space between the end cap 370 and planar surface of the lid 372 is exposed to the downstream filter pressure of the engine whereas the upstream filter pressure acts on the potting compound on the opposite side of the end cap 370. Thus, a pressure differential exists across the end cap which creates a force pushing the end cap 370 against the lid 311.

This approach is significant because it eliminates the radial seal on one side of the filter. By eliminating the radial seal, the cover of the housing may be removed without exerting undue torque, and the overall design is simplified. If a radial seal were used, the radial seal would resist removal of the cover for a significant portion of the travel of the cover as the mating threads are disengaged.

Figure 11:
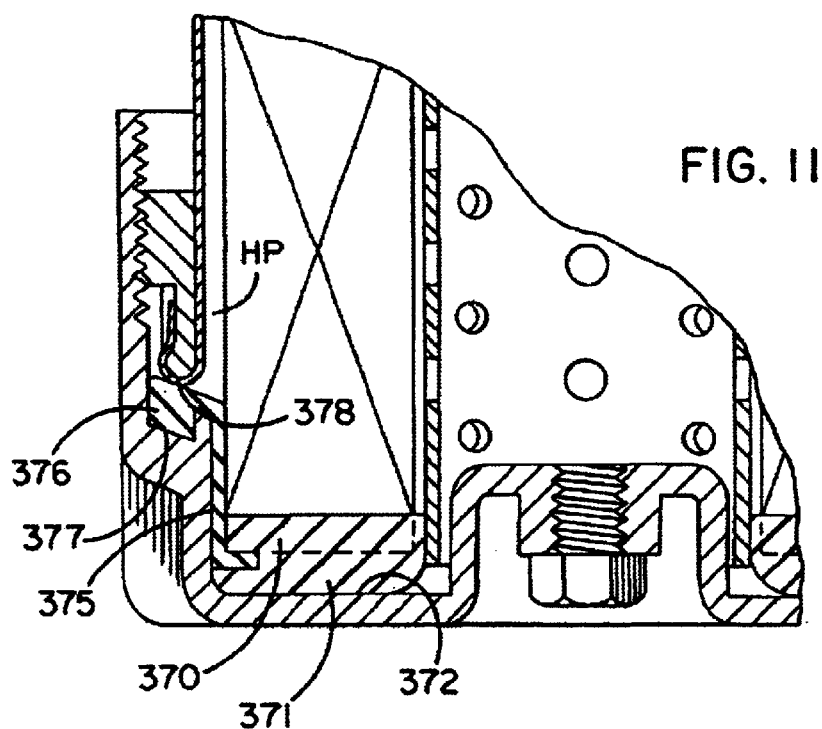
FIG. 11 is an enlarged sectional view showing the end cap and axial seal of the filter system of FIG. 10.

It will be seen from FIGS. 10, 11, and 15 that the arrangement has provided therewith a suspended housing gasket 376, configured much like the embodiments described above. However, in the case of the present embodiment, there is no need to make the suspension ring 375 for the axial gasket 376 in a segmented form, since no flow through that section is desired, and indeed it is desirable to prevent flow through that section. Thus, the seal 376 is carried at the appropriate point to interfit between a sealing surface 377 of the cover and a shoulder 378 of the housing, so that the seal is complete upon replacing the cover.

Turning to the upper end of the filter, the upper end cap 349 is preferably configured similar to end cap described above. Accordingly, end cap 349 has a contact member 381 formed in an annular disc having a radially extending face covering at least part of the end of the filter element, and a cylindrical wall extending axially into the internal chamber (FIG. 15). The radial seal gasket 332 associated with the end cap 349 is configured as a preformed elastomeric ring with an attachment arm 382 fitting into the contact member 381 and a retention wall 383 extending axially along the outer periphery of the filter element. The contact member 381 is preferably formed of thermoplastics material such as nylon. In an alternative embodiment, the contact member 381 and radial seal gasket 332 are integrally formed of thermoset elastomer or thermoplastic elastomer (TPE) material.

Figure 13:
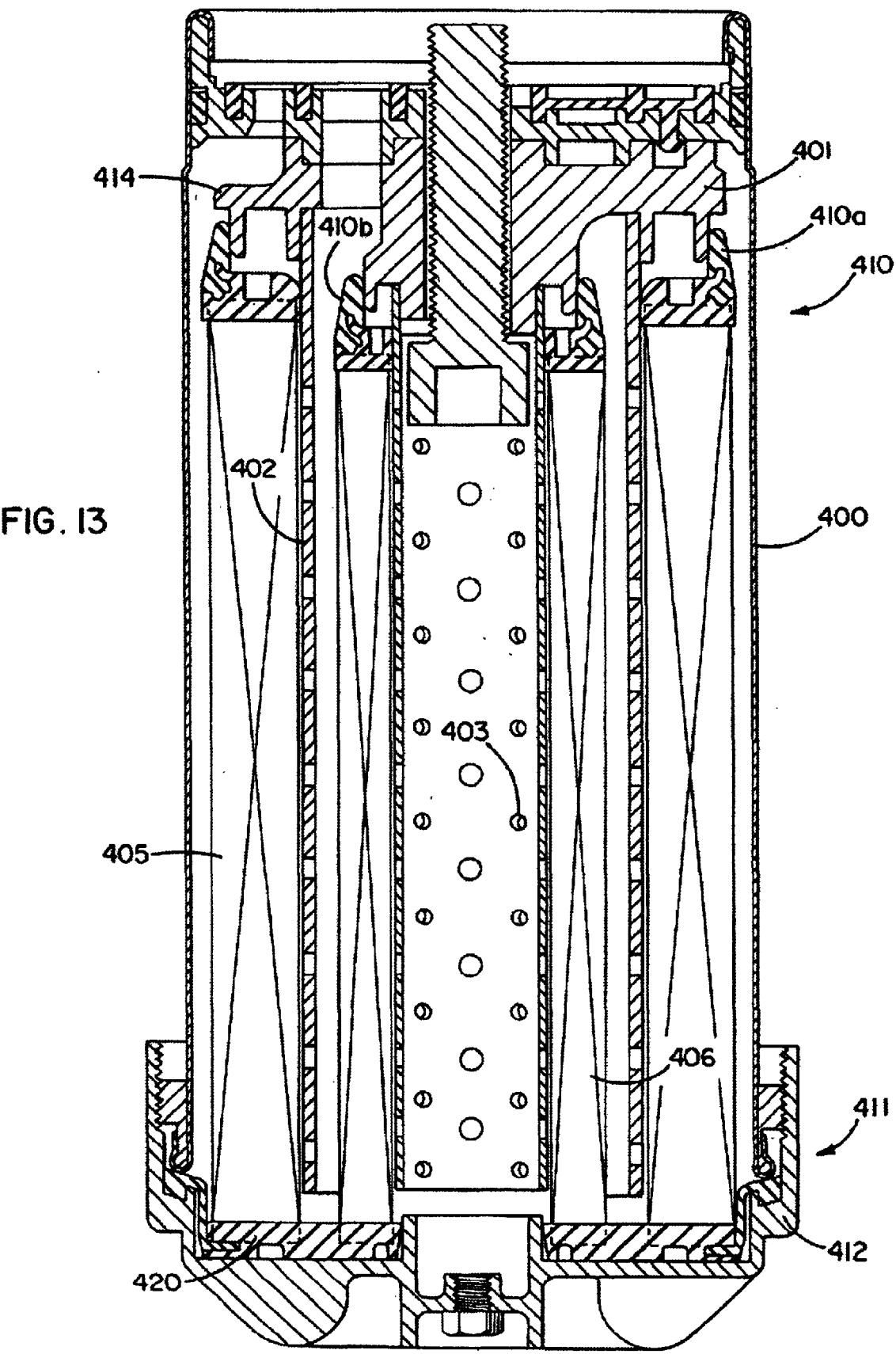
FIG. 13 is a sectional view taken through the center line of a filter of yet another embodiment of the present invention intended primarily for first fit or OEM applications requiring dual flow filters.
Figure 17:
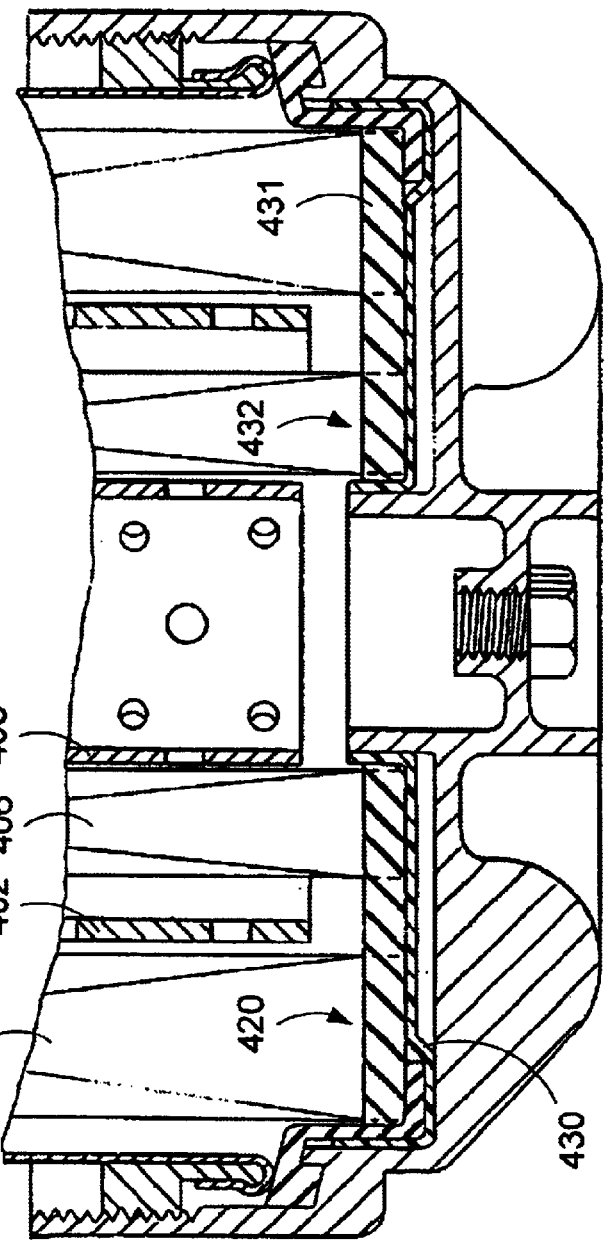
FIG. 17 is an enlarged sectional view of still another embodiment of a filter system employing a filter cartridge and having a dual flow filter and an end cap comprising a thermoplastic contact member, the filter cartridge adapted for OEM installations.

Another embodiment of a filter system employing the present invention is illustrated in FIG. 13, and will be described only briefly. It is similar to the FIG. 10 embodiment in that it is an OEM version in which a housing 400 is mounted to a base plate 401 which carries supporting center tubes. In this case, however, there are two supporting center tubes 402, 403 carried in the base plate. The filter assembly has two concentric cylindrical filters 405, 406, similar to the embodiment of FIG. 6. One difference between those embodiments, however, is that the filter arrangement of FIG. 12 contains one set of radial seals at the cartridge end 410 and a second set of axial seals at the cartridge end 411. The end cap 420 at the axially sealed end 411 has a contact member 430 formed in a continuous cylindrical ring for joining both filter elements 405, 406, as best illustrated in FIG. 17. The contact member 430 is bonded to the filter elements with potting compound 431 to form an imperforate unitary end cap 420 which loads the filter cartridge in a direction to enhance the axial seal. Thus, like the previous embodiments, the sealing arrangement provides an axial force in the housing which forces the axial seals at end 411 into engagement.

Figure 18:
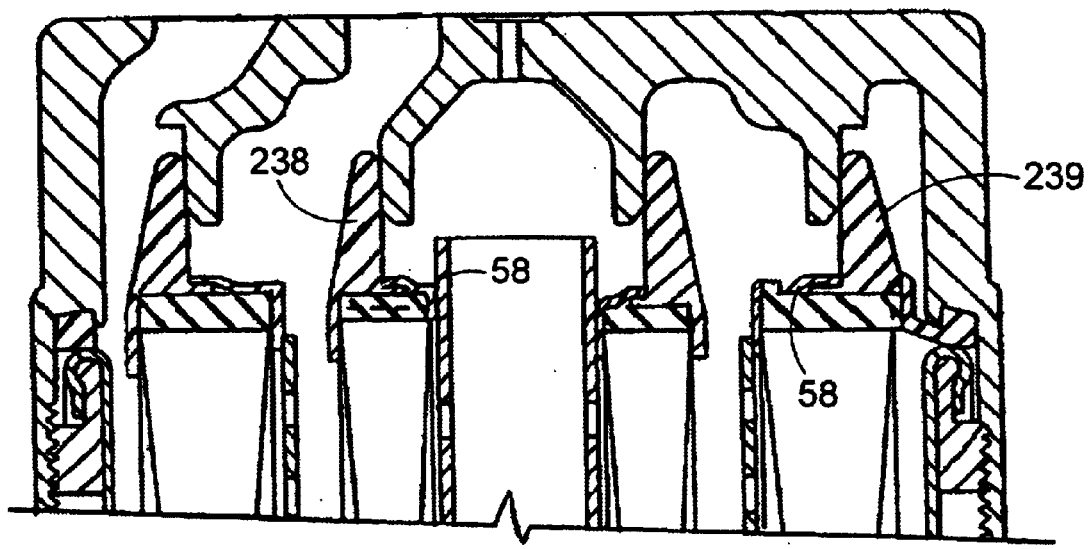
FIG. 18 is an enlarged sectional view of a top end of an embodiment of the filter system.

In the most preferred embodiment, the contact member 430 is preferably shaped in an annular channel 432, as best shown in FIG. 17. The contact member 430 is preferably formed of plastic material, such as nylon. Alternatively, the contact member 430 may be integrally formed with a suspended gasket out of thermoset material. The opposite ends of the filter elements each have an end cap with a contact member as shown in FIGS. 18 and described above.

The high pressure in the outer peripheral zones, like the FIG. 6 embodiment, enhances the effectiveness of the radial seals 410a, 410b. A flow diverter 414 prevents direct impingement on the radial seal 410a. Without further elaboration, due to the similarities pointed out, the structure and operation of the filter of FIG. 12 will now be apparent.

It will be clear that what has been provided is an improved disposable filter cartridge which functions in a filter system adapted to protect the cartridge from potentially damaging pressure differentials. The filter cartridge has no supporting center tube—in the preferred embodiment it is simply a pleated paper filter which may be overwrapped with paper. The end caps preferably comprise thermoplastic contact members which are bonded to the filter media with potting material which is incineratable, and which is also suitable for landfills. The gasketing elements can be formed of the potting material, but in the preferred embodiment are preferably of thermoset elastomer material (such as nitrile and rubber) or thermoplastic elastomer material, having attachment arms which engage the end caps. The gasket material may be selected so that it is suitable for landfills and also can be incinerated.

The filter cartridge thus contains no metal, and nothing which is toxic when incinerated. The filter is readily crushable with light pressure, and used filters can be crushed in a relatively simple apparatus to remove residual oil and also to substantially reduce volume. After crushing, the filters may be suitable for landfill or for incineration, as desired. The absence of a supporting center tube, normally associated with such filters, is a very significant element in rendering the filters suitable for environmentally friendly disposal.

However, the absence of the supporting center tube is compensated for by the special configuration of the filter cartridge in combination with the sealing arrangement of the housing. At least one end of the filter cartridge is provided with radial seals positioned at the outer periphery of the filter in order to separate a high pressure outer peripheral zone from lower pressure zones at the internal, portion of the filter and also at the end caps. The positioning and structure of the axial seals serves to assure that no portion of the end cap is in the high pressure zone. As a result of that structure, any axial forces imposed on the filter place the filter media in tension rather than in compression, and it will be found that most suitable filter media, including paper and neoprene, readily withstand the axial loads imposed.

In one embodiment of the invention, radial seals are placed at both ends of the filter housing, and flow at both ends of the filter is allowed. In another embodiments flow at only one end of the filter is needed, and the other end is provided with an axial seal which is capable of performing the isolation function associated with the radial seal. Indeed, in that embodiment, axial forces on the filter tend to load the axial seal against its seat, preventing leakage.

Further details of the mechanical arrangement of the filter housing will be found in application Ser. No. 08/575,625 filed concurrently with our prior application and entitled Oil Filter Housing, which describes and claims the mechanical configuration of the filter housing. Additional details of the filter and cartridge, and their interrelationship can be found in application Ser. No. 08/575,515 filed concurrently with our prior application and entitled Filter System for Environmentally Friendly Filter Cartridge, which describes and claims the cooperative relationship between the filter cartridge and housing. To the extent necessary, the description of those applications is incorporated here by reference. However, it will also be clear to those skilled in the art that adequate detail of the invention has been provided herein to enable one skilled in the art to practice the present invention.

It is worthy of note that the present filter cartridge and filter system is suitable for use not only in automotive oil filter applications, but in other more stringent applications as well. Indeed, in automotive applications, the present filter cartridge cain be used without the need for providing high, pressure relief valves, if so required. In addition, in other applications, such as diesel fuel filters, or hydraulic filters, no overload valve is permissible. In these applications, if the filter begins to plug, it is preferable to degrade performance of the machine so that the filter is changed, rather than bypass the filter and risk damaging expensive equipment. However, using conventional unsupported filter media in such applications is ineffective, because, without the bypass valve, the filter would likely be crushed by high pressures encountered in a plugged filter operation, and that would clearly result in damage to the equipment.

According to the present invention, there is no substantial danger of such damage, because the filter is configured in the manner described above so that all radial loads on the filter are supported by the permanent center tube, and all axial loads place the filter media in tension so that any axial loads imposed on the filter media in a plugged filter condition will be readily withstandable by the filter cartridge.

What is claimed is:

1. A disposable filter cartridge for mounting in a filter housing, the filter housing including a non-planar axially extending seating surface following a ring-shaped path having no structural metal parts and comprising in combination:

a pleated paper filter media formed into a cylinder coaxial about an axis in which the pleats define a cylindrical internal bore within the filter media and a cylindrical outer periphery, first and second end caps connected to the pleats at respective axial ends of the filter media, the filter cartridge having an intended flow path from a higher pressure region at its outer periphery to a lower pressure region at its internal bore, the first end cap having associated therewith an elastomeric radial seal gasket positioned at the outer periphery to protect the corresponding end cap from the higher pressure region at the outer periphery of the filter cartridge, the radial seal gasket having a sealing flange, the sealing flange including a sealing surface with a diameter closely dimensioned to the outer diameter of the axially extending seating surface such that the sealing flange is adapted to be pressed radially inward toward the axis into a sealing relationship against the axially extending seating surface by said higher pressure, the second end cap having associated therewith gasket means for preventing the higher pressure in the region at the outer periphery of the filter cartridge from being applied to the outside end of said second end cap, the end caps and pleats being adapted to accept a structural supporting tube in a filter housing to assist the pleated paper in withstanding pressure applied in a radial direction from the outer periphery to the internal bore, the gaskets associated with the respective end caps being configured to communicate the lower pressure in the region at the internal bore to the end caps to avoid the application of crushing axial loads to the filter cartridge.

2. The combination as set forth in claim 1 in which the first and second end caps comprise a contact member and potting material for bonding the contact member to the pleats at respective axial ends of the filter media.

3. The combination as set forth in claim 2 in which the gasket means associated with the second end cap is a second radial seal gasket.

4. The combination as set forth in claim 3 in which the contact member of both the first and second end caps has a generally annular shape comprising a radially extending face covering at least a portion of a corresponding end of the filter media and an axially disposed wall closely fitting the internal bore.

5. The combination as set forth in claim 2 in which the gasket means associated with the second end cap is an axial seal gasket.

6. The combination as set forth in claim 5 in which the contact member of the first end cap has a generally annular shape comprising a radially extending face covering at least a portion of a corresponding end of the filter media and an axially disposed wall closely fitting the internal bore, and the contact member of the second end cap is formed in an annular channel with inner and outer walls closely fitting the internal bore and outer periphery, respectively.

7. The combination as set forth in claim 2 in which the contact member is formed of a thermoplastic material.

8. The combination as set forth in claim 7 in which the thermoplastic material is nylon.

9. The combination as set forth in claim 2 in which the radial seal gasket and gasket means are formed of nitrile.

10. The combination as set forth in claim 1 in which the first end cap is formed integrally with the radial seal gasket to provide a first composite member, and the second end cap is formed integrally with the gasket means to provide a second composite member.

11. The combination as set forth in claim 10 in which the first and second composite members are formed of elastomeric material.

12. The combination as set forth in claim 11 in which the first and second composite members are formed of thermoplastic elastomer material.

13. The combination as set forth in claim 11 in which the first and second composite members are formed of nitrile.

14. The combination as set forth in claim 1 wherein the pleated paper filter media comprises a first cylinder and further includes a second pleated paper filter media comprising a second cylinder concentric with and located inside the first cylinder, the second cylinder also having first and second end caps and gasket means at the respective axial ends thereof, the gasket means of the second cylinder including at least one radial seal gasket and being adapted to protect the respective end caps from the pressure at the outer periphery of second end cap.

15. The combination as set forth in claim 14 in which the first and second end caps of the first and second cylinders each comprise a contact member and potting material for bonding the contact member to the pleats at respective axial ends of the cylinders.

16. The combination as set forth in claim 15 in which the gasket means associated with the second end caps of the first and second cylinders are radial seal gaskets.

17. The combination as set forth in claim 16 in which the contact members of the end caps have a generally annular shape comprising a radially extending face covering at least a portion of an end of a corresponding cylinder and an axially disposed wall closely fitting the internal bore of the corresponding cylinder.

18. The combination as set forth in claim 15 in which the gasket means associated with the second end caps are axial seal gaskets.

19. The combination as set forth in claim 18 in which the contact members of the first end caps have a generally annular shape comprising a radially extending face covering at least a portion of an end of a corresponding cylinder and an axially disposed wall closely fitting the internal bore of the corresponding cylinder, and the second end caps of the first and second cylinders integrally formed to have a contact member shaped in an annular channel with inner and outer walls closely fitting the internal bore of the second cylinder and the outer periphery of the fist cylinder, respectively.

20. The combination as set forth in claim 15 in which the contact member is formed of a thermoplastic elastomer material.

21. The combination as set forth in claim 20 in which the thermoplastic material is nylon.

22. The combination as set forth in claim 15 in which the radial seal gasket and gasket means are formed of nitrite.

* * * * *